United States Patent
Yamakawa et al.

(10) Patent No.: US 10,757,266 B2
(45) Date of Patent: Aug. 25, 2020

(54) TERMINAL DEVICE, AND INTERCOM SYSTEM PROVIDED WITH TERMINAL DEVICE

(71) Applicant: AIPHONE CO., LTD., Nagoya-shi, Aichi (JP)

(72) Inventors: Seiya Yamakawa, Nagoya (JP); Akira Kai, Nagoya (JP); Kenji Yasukawa, Nagoya (JP)

(73) Assignee: AIPHONE CO., LTD., Nagoya-Shi, Aichi (JP)

( * ) Notice: Subject to any disclaimer, the term of this patent is extended or adjusted under 35 U.S.C. 154(b) by 0 days.

(21) Appl. No.: 16/089,348

(22) PCT Filed: Mar. 28, 2016

(86) PCT No.: PCT/JP2016/059815
§ 371 (c)(1),
(2) Date: Sep. 27, 2018

(87) PCT Pub. No.: WO2017/168489
PCT Pub. Date: Oct. 5, 2017

(65) Prior Publication Data
US 2019/0124205 A1    Apr. 25, 2019

(51) Int. Cl.
*H04M 9/00* (2006.01)
*H04M 9/02* (2006.01)
*H04M 11/02* (2006.01)

(52) U.S. Cl.
CPC .......... *H04M 9/02* (2013.01); *H04M 11/025* (2013.01)

(58) Field of Classification Search
None
See application file for complete search history.

(56) References Cited

U.S. PATENT DOCUMENTS 6,317,489 B1* 11/2001 Parsadayan .......... H04M 11/025
379/102.06
6,879,670 B2* 4/2005 Shinozaki ....... H04M 1/274525
379/167.01
(Continued)

FOREIGN PATENT DOCUMENTS

DE    102012100564 A1    7/2013
JP    H03-066255 A    3/1991
(Continued)

OTHER PUBLICATIONS

International Search Report and Written Opinion for related International Application No. PCT/JP2016/059815, dated Jun. 14, 2016; English translation for ISR provided; 7 pages.
(Continued)

*Primary Examiner* — Quoc D Tran
(74) *Attorney, Agent, or Firm* — Procopio, Cory, Hargreaves & Savitch LLP

(57) ABSTRACT

A terminal device configured to communicate with room parent devices installed in respective rooms is equipped with an input unit enabling input of a dweller name as a call manipulation for calling a room parent device; a storage unit stored with a call table in which a room number, a dweller name, and room parent device identification information assigned to each of the room parent devices are correlated; and a control unit determining a call target room parent device based on an input content of the call manipulation and the call table and performing call control for calling the determined room parent device. In adding a new dweller name for an existing room number to the call table stored in the storage unit, the control unit automatically registers, as room parent device identification information of the new dweller name, the room parent device identification information assigned to the room number.

6 Claims, 9 Drawing Sheets

(56) References Cited

U.S. PATENT DOCUMENTS

| | | | |
|---|---|---|---|
| 7,783,018 B1* | 8/2010 | Goldberg | H04M 11/025 379/102.06 |
| 8,271,321 B1* | 9/2012 | Kestenbaum | G06Q 50/163 705/14.1 |
| 2011/0007883 A1 | 1/2011 | Bingham et al. | |
| 2011/0016448 A1* | 1/2011 | Bauder | G06F 8/34 717/104 |
| 2011/0103564 A1* | 5/2011 | Couse | H04M 1/2535 379/201.03 |
| 2013/0017812 A1* | 1/2013 | Foster | H04L 12/2825 455/417 |
| 2014/0219431 A1* | 8/2014 | Wagner | H04M 11/025 379/167.02 |
| 2016/0294572 A1* | 10/2016 | Shadid | G07C 9/00182 |

FOREIGN PATENT DOCUMENTS

| | | | |
|---|---|---|---|
| JP | 05252278 A | 9/1993 | |
| JP | 2004-260679 A | 9/2004 | |
| JP | 2007-060408 A | 3/2007 | |
| JP | 2009182843 A | 8/2009 | |
| JP | 2010177937 A | 8/2010 | |

OTHER PUBLICATIONS

Extended European Search Report dated Jun. 17, 2019, issue for International Patent Application No. PCT/JP2016/059815, 8 pgs.
Notification of Reasons for Refusal for related JP App No. 2018-507818, dated Sep. 10, 2019, 7 pgs.

* cited by examiner

Fig.4

| RESIDENTIAL BUILDING-A | | | CALL TABLE A |
|---|---|---|---|
| REGISTRATION NO. | ROOM NO. | DWELLER NAME | ROOM PARENT DEVICE ID |
| 1 | 101 | ABE | S1 |
| 2 | 101 | TANAKA | S1 |
| 3 | 101 | JONES | S1 |
| 4 | 101 | SUZUKI | S1 |
| 5 | 102 | IIZUKA | S2 |
| 6 | 102 | Harry | S2 |
| 7 | 103 | AOKI | S3 |
| 8 | 103 | YAMAZAKI | S3 |
| 9 | 103 | SIMOYANAGI | S3 |
| ⋮ | ⋮ | ⋮ | ⋮ |

Fig.5

| RESIDENTIAL BUILDING-A | | | CALL TABLE A |
|---|---|---|---|
| REGISTRATION NO. | ROOM NO. | DWELLER NAME | ROOM PARENT DEVICE ID |
| 1 | 101 | ABE | S1 |
| 2 | 102 | IIZUKA | S2 |
| 3 | 103 | AOKI | S3 |
| ⋮ | ⋮ | ⋮ | ⋮ |

Fig.6A

| RESIDENTIAL BUILDING-A | | | CALL TABLE A |
|---|---|---|---|
| REGISTRATION NO. | ROOM NO. | DWELLER NAME | ROOM PARENT DEVICE ID |
| 1 | 101 | ABE | S1 |
|  | 101 | TANAKA |  |
| 2 | 102 | IIZUKA | S2 |
| 3 | 103 | AOKI | S3 |
| ⋮ | ⋮ | ⋮ | ⋮ |

Fig.6B

| RESIDENTIAL BUILDING-A | | | CALL TABLE A |
|---|---|---|---|
| REGISTRATION NO. | ROOM NO. | DWELLER NAME | ROOM PARENT DEVICE ID |
| 1 | 101 | ABE | S1 |
| 2 | 101 | TANAKA | S1 |
| 3 | 102 | IIZUKA | S2 |
| 4 | 103 | AOKI | S3 |
| ⋮ | ⋮ | ⋮ | ⋮ |

Fig.7A

| RESIDENTIAL BUILDING-A | | | CALL TABLE A |
|---|---|---|---|
| REGISTRATION NO. | ROOM NO. | DWELLER NAME | ROOM PARENT DEVICE ID |
| 1 | 101 | ABE | S1 |
| 2 | 101 | TANAKA | S1 |
| 3 | 101 |  | S1 |
| 4 | 101 | SUZUKI | S1 |
| 5 | 102 | IIZUKA | S2 |
| 6 | 102 | Harry | S2 |
| 7 | 103 | AOKI | S3 |
| 8 | 103 | YAMAZAKI | S3 |
| 9 | 103 | SIMOYANAGI | S3 |
| ⋮ | ⋮ | ⋮ | ⋮ |

Fig.7B

| RESIDENTIAL BUILDING-A | | | CALL TABLE A |
|---|---|---|---|
| REGISTRATION NO. | ROOM NO. | DWELLER NAME | ROOM PARENT DEVICE ID |
| 1 | 101 | ABE | S1 |
| 2 | 101 | TANAKA | S1 |
| 3 | 101 | SUZUKI | S1 |
| 4 | 102 | IIZUKA | S2 |
| 5 | 102 | Harry | S2 |
| 6 | 103 | AOKI | S3 |
| 7 | 103 | YAMAZAKI | S3 |
| 8 | 103 | SIMOYANAGI | S3 |
| ⋮ | ⋮ | ⋮ | ⋮ |

Fig.8

| RESIDENTIAL BUILDING-A | | | CALL TABLE A |
|---|---|---|---|
| REGISTRATION NO. | ROOM NO. | DWELLER NAME | ROOM PARENT DEVICE ID |
| | 101 | | S1 |
| 1 | 102 | IIZUKA | S2 |
| 2 | 102 | Harry | S2 |
| 3 | 103 | AOKI | S3 |
| 4 | 103 | YAMAZAKI | S3 |
| 5 | 103 | SIMOYANAGI | S3 |
| ⋮ | ⋮ | ⋮ | ⋮ |

Fig.9A

| RESIDENTIAL BUILDING-A | | | CALL TABLE A |
|---|---|---|---|
| REGISTRATION NO. | ROOM NO. | DWELLER NAME | ROOM PARENT DEVICE ID |
| 1 | 101 | ABE | S1 |
| 2 | 101 | TANAKA | S1 |
| 3 | 101 | SUZUKI | S1 |
| 4 | 102 | IIZUKA | S2 |
| 5 | 102 | Harry | S2 |
|  | 102 | KAWAI |  |
| 6 | 103 | AOKI | S3 |
| 7 | 103 | YAMAZAKI | S3 |
| 8 | 103 | SIMOYANAGI | S3 |
| ⋮ | ⋮ | ⋮ | ⋮ |

Fig.9B

| RESIDENTIAL BUILDING-A | | | CALL TABLE A |
|---|---|---|---|
| REGISTRATION NO. | ROOM NO. | DWELLER NAME | ROOM PARENT DEVICE ID |
| 1 | 101 | ABE | S1 |
| 2 | 101 | TANAKA | S1 |
| 3 | 101 | SUZUKI | S1 |
| 4 | 102 | IIZUKA | S2 |
| 5 | 102 | Harry | S2 |
| 6 | 102 | KAWAI | S2 |
| 7 | 103 | AOKI | S3 |
| 8 | 103 | YAMAZAKI | S3 |
| 9 | 103 | SIMOYANAGI | S3 |
| ⋮ | ⋮ | ⋮ | ⋮ |

TERMINAL DEVICE, AND INTERCOM SYSTEM PROVIDED WITH TERMINAL DEVICE

CROSS-REFERENCE TO RELATED APPLICATIONS

This application is a U.S. National Stage entry of PCT Application No: PCT/JP2016/059815 filed on Mar. 28, 2016, the contents of which are incorporated herein by reference.

TECHNICAL FIELD

The present invention relates to a terminal device and an intercommunication system that are used in an apartment complex.

BACKGROUND ART

Intercommunication systems for an apartment complex are known as conventional systems. A visitor can call a visit destination room parent device by manipulating a collective entrance device installed in the entrance of a residential building.

PRIOR ART DOCUMENTS

Patent Documents

Patent document 1: JP-A-2004-260679

SUMMARY OF THE INVENTION

Problems to be Solved by the Invention

Pieces of room parent device identification information (room parent device IDs) are registered in a call table to be referred to in making a call manipulation, so as to be correlated with room numbers and dweller names (including other names), respectively. At the time of installing an intercommunication system, link setting work of storing the room parent device IDs registered in the call table in corresponding room parent devices is necessary. Link setting work needs to be carried out while the collective entrance device and each room parent device are caused to communicate with each other with workers standing beside both of the collective entrance device and the room parent device. Furthermore, link setting work needs to be carried out every time the call table is updated because of, for example, addition of a dweller name. As is understood from the above, in conventional intercommunication systems, the load of link setting work is heavy.

An object of the invention is therefore to provide a terminal device and an intercommunication system equipped with terminal devices that can reduce the load of work of setting links with room parent devices.

Means for Solving the Problems

To attain the above object, the invention provides a terminal device which is configured so as to be able to communicate with room parent devices installed in respective rooms, comprising:

an input unit which enables input of at least a dweller name as a call manipulation for calling a particular room parent device;

a storage unit which is stored with a call table in which a room number, a dweller name, and room parent device identification information assigned to each of the room parent devices are correlated with each other; and a control unit which determines a call target room parent device on the basis of an input content of the call manipulation and the call table and performs a call control for calling the determined room parent device, wherein:

in adding a new dweller name for an existing room number to the call table stored in the storage unit, the control unit automatically registers, as room parent device identification information of the new dweller name, the room parent device identification information that is already assigned to the same room number.

In this configuration, when a construction worker or a manager adds a new dweller name for an existing room number, a room parent device identification information that is already assigned to the same room number is registered as room parent device identification information of the new dweller name. Thus, in making initial setting of a call table, it suffices to carry out link setting work only in registering a first dweller name for one room number; it is not necessary to carry out link setting work in adding second and following dweller names for the same room number. Likewise, in updating a call table, it is not necessary to carry out link setting work in adding second and following dweller names for the same room number. In this manner, in registering plural dweller names for the same room number, the number of times of carrying-out of link setting work can be made smaller and hence the load of link setting work can be reduced.

The terminal device according to the invention may be such that in deleting an already registered dweller name for an existing room number from the call table stored in the storage unit, the control unit automatically deletes room parent device identification information that is correlated with the dweller name to be deleted.

In this configuration, when a dweller name has been deleted, no unnecessary past data remain in the call table as a result of the deletion of only the dweller name. This allows a worker to check a current status of the call table easily.

The terminal device according to the invention may be such that in deleting a last already registered dweller name for an existing room number from the call table stored in the storage unit, the control unit does not automatically delete room parent device identification information that is correlated with the dweller name to be deleted.

When the name of the last one of dwellers who have already been registered for the same room number is deleted, if a room parent device ID that is correlated with the dweller name to be deleted were deleted, a situation occurs that no room parent device ID is registered for this room number. This requires work of setting a new link in registering a new dweller name for that room number later.

In contrast, in the above configuration, in deleting the name of the last one of dwellers who have already been registered for the same room number, a room parent device ID that is correlated with the dweller name to be deleted is not deleted. As a result, even if the last dweller name is deleted, the state that link setting is made for a room parent device corresponding to this room number can be maintained.

The terminal device according to the invention may be such that:

the control unit can operate in a constructor setting mode in which a construction worker who installs a terminal device can set a call table and in a manager setting mode in which a manager can set a call table; and:

in adding a new dweller name for an existing room number to the call table stored in the storage unit in the manager setting mode, the control unit automatically registers, as room parent device identification information of the new dweller name, the room parent device identification information that is already assigned to the same room number.

In this configuration, the manager is also given the right to add a dweller name for an existing room number to the call table. As a result, even in a case that plural dwellers come to live in or leave, in a short period, a room that is used in, for example, a shared house form, the manager can easily update the call table without carrying out link setting work.

The invention also provides an intercommunication system comprising the terminal device having any of the above configurations.

According to this configuration, an intercommunication system can be provided which can reduce the load of link setting work.

Advantages of the Invention

The terminal device and the intercommunication system equipped with terminal devices according to the invention can reduce the load of work of setting links between a room parent device and a terminal device.

BRIEF DESCRIPTION OF THE DRAWINGS

FIG. 4 shows an example call table A which is stored in a collective entrance device of residential building-A.

FIG. 5 illustrates generation of a call table.

FIG. 6A illustrates how a dweller name is registered in the call table.

FIG. 6B illustrates how a dweller name is registered in the call table.

FIG. 7A illustrates how a dweller name is deleted from the call table.

FIG. 7B illustrates how a dweller name is deleted from the call table.

FIG. 8 illustrates how a last dweller name is deleted from the call table.

FIG. 9A illustrates a dweller name is added to the call table.

FIG. 9B illustrates a dweller name is added to the call table.

MODES FOR CARRYING OUT THE INVENTION

An exemplary embodiment will be hereinafter described with reference to the drawings.

Figure 1:
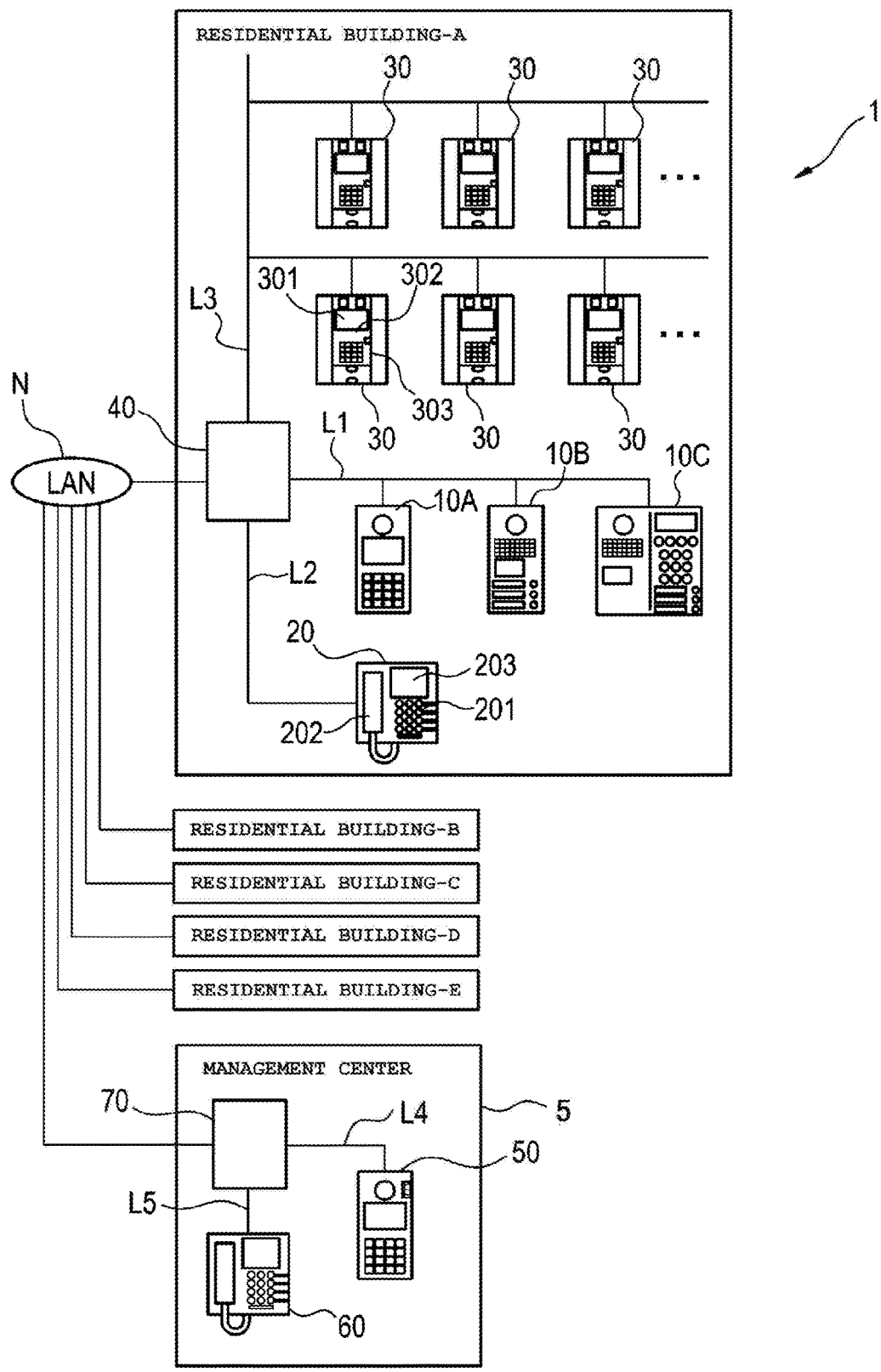
FIG. 1 shows the configuration of an intercommunication system according to an embodiment of the present invention.

As shown in FIG. 1, an intercommunication system 1 is a system used for an apartment complex. Although the embodiment is directed to the apartment complex comprising plural residential buildings (residential building-A to residential building-E), the invention can also be applied to an apartment complex comprising one residential building, for example. Residential building-A to residential building-E are connected to each other by a network N (in the embodiment, LAN (local area network)) in which a communication is performed according to a general-purpose protocol. The apartment complex is provided with a management center 5 (example intensive building) which is connected to the individual residential buildings by the network N.

The intercommunication system 1 is equipped with collective entrance devices 10A-10C (example terminal devices), a management room parent device 20 (example terminal device), room parent devices 30, and a building control unit 40. Although FIG. 1 shows these devices and unit only for residential building-A, residential building-B to residential building-E are configured in the same manner as residential building-A.

The collective entrance devices 10A-10C (hereinafter may be referred to as a generic term "collective entrance device(s) 10") are installed in, for example, each collective entrance or shared space of the apartment complex. The collective entrance devices 10 are configured so as to be able to call, for example, a room parent device 30 or the management room parent device 20 in the building where it is installed. Furthermore, the collective entrance devices 10 are configured so as to make it possible to perform an input manipulation on, for example, data stored therein. For example, the collective entrance devices are of a type having keys that enable input of a room number and a name or a person or another kind of name (e.g., collective entrance device 10A), a type having dedicated buttons that are correlated with respective names of persons or other names (e.g., collective entrance device 10B), or of a type having keys that enable input of a room number and a name or a person or another kind of name and dedicated buttons that are correlated with respective names of persons or other names (e.g., collective entrance device 10C). The collective entrance devices 10 are connected to the building control unit 40 by an intercom line (dedicated line) L1 so as to be able to communicate with it. The collective entrance devices 10 are connected to the management room parent device 20 by intercom lines L1 and L2 so as to be able to communicate with it. The collective entrance devices 10 are connected to the room parent devices 30 by intercom lines L1 and L3 so as to be able to communicate with them.

The management room parent device 20 is installed in each management room of the apartment complex. The management room parent device 20 is equipped with a manipulation unit 201 (example input unit), a conversation unity 202, a display unit 203, etc. The management room parent device 20 is configured so as to be able to call, for example, a room parent device 30 in the building where it is installed by manipulating the manipulation unit 201. The management room parent device 20 is connected to the building control unit 40 by an intercom line L2 so as to be able to communicate with it and is connected to the room parent devices 30 by the intercom lines L2 and L3 so as to be able to communicate with them.

The room parent device 30 is installed in each dwelling unit of the apartment complex. Equipped with a display unit 301, a manipulation unit 302, a conversation unit 303, etc., the room parent device 30 is configured so as to be able to respond to a call from, for example, a collective entrance device 10 or the management room parent device 20. The individual room parent device 30 is assigned and stored with information for identification of it (e.g., room parent device ID (identification)). The room parent device 30 is connected to the building control unit 40 by the intercom line L3 so as to be able to communicate with it.

The building control unit 40 controls, for example, exchange of a communication with the collective entrance devices 10 via the intercom lines, the management room parent device 20, and the room parent devices 30 which are connected to it by the intercom lines. The building control unit 40 is connected to the building control units 40 of the other residential buildings (in the embodiment, residential building-B to residential building-E) and an intensive control unit 70 (described later) of the management center 5 by the network N so as to be able to communicate with them.

The management center 5 is configured so as to be able to manage the entire apartment complex, that is, residential building-A to residential building-E, and is equipped with an intensive collective entrance device 50, an intensive management room parent device 60, and the intensive control unit 70. The intensive collective entrance device 50 is installed in an entrance of the management center 5, and is configured so as to be able to call, for example, a room parent device 30 of each residential building and the intensive management room parent device 60 of the management center 5. The intensive collective entrance device 50 is connected to the intensive control unit 70 by an intercom line L4 so as to be able to communicate with it. The intensive management room parent device 60 is installed in a management room of the management center 5, and is configured so as to be able to call, for example, a room parent device 30 of each residential building. The intensive management room parent device 60 is connected to the intensive control unit 70 by an intercom line L5 so as to be able to communicate with it. The intensive control unit 70 controls, for example, exchange of a communication with the intensive collective entrance device 50 and the intensive management room parent device 60. The intensive control unit 70 is connected to the building control unit 40 of each of residential building-A to residential building-E by the network N.

Figure 2:
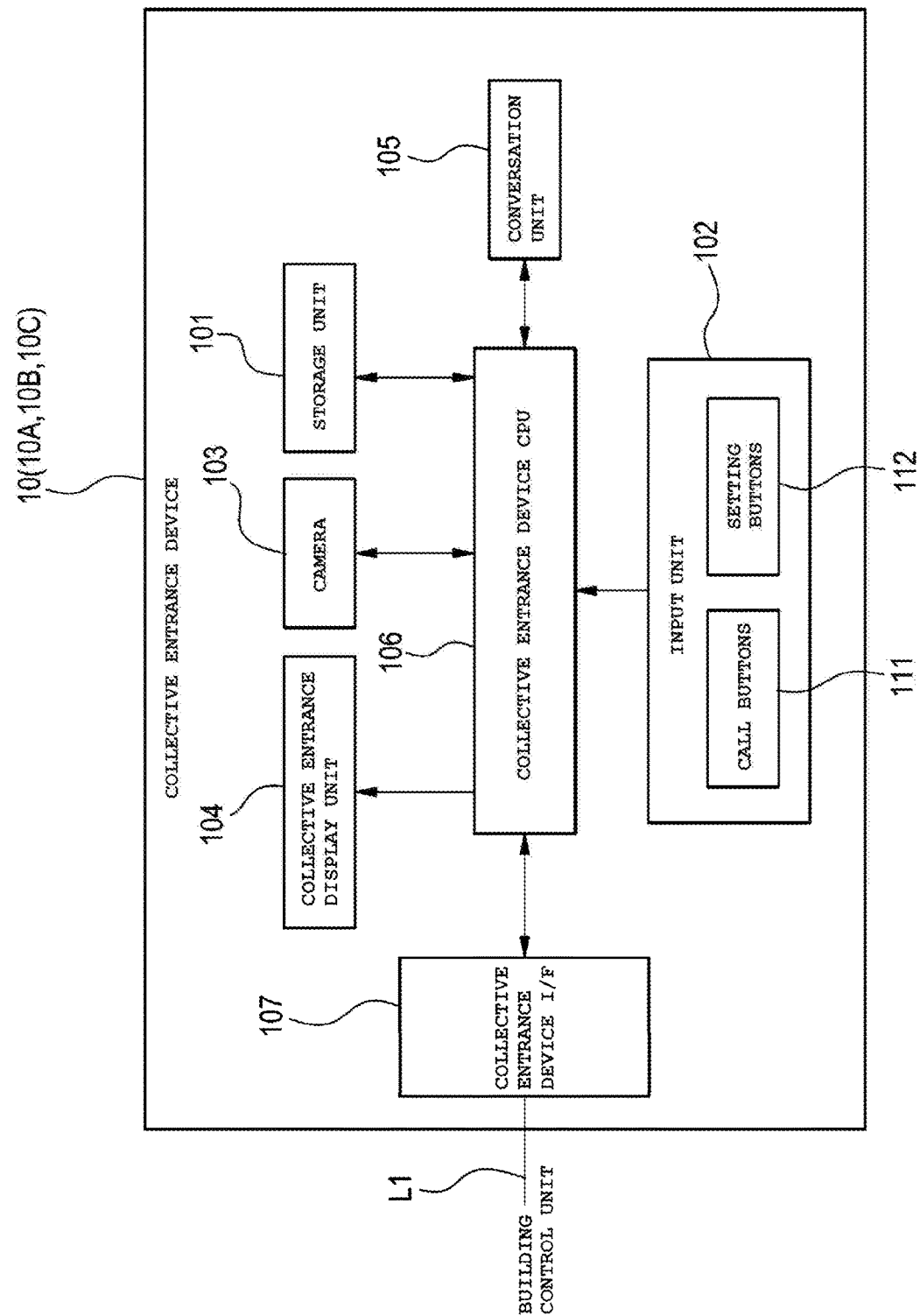
FIG. 2 is a functional block diagram of a collective entrance device.

As shown in FIG. 2, each collective entrance device 10 is equipped with a storage unit 101, an input unit 102, a camera 103, a collective entrance display unit 104, a conversation unit 105, a collective entrance device CPU 106 (example control unit), and a collective entrance device interface 107 (in the following, the term "interface" will be abbreviated as "I/F").

The storage unit 101 is stored with, among other information, a call table in which room numbers of the rooms of the building where it is installed and names of dwellers of rooms and names (e.g., tenant names) of rooms are correlated with room parent device IDs (example pieces of room parent device identification information) for identification of the room parent devices 30 of the rooms, respectively.

The input unit 102 is manipulated when a visitor or the like calls the room parent device 30 of a visit destination or the management room parent device 20 in the management room. The input unit 102 is also manipulated when a construction worker who installs the intercommunication system 1 or a manager sets a call table in the storage unit 101. The input unit 102 has call buttons 111 to be manipulated to call a call target, setting buttons 112 to be manipulated to set a call table, and other things.

The camera 103 takes an image of a visitor or the like who is manipulating the collective entrance device 10. The collective entrance display unit 104 displays a room number of a room that is input through the input unit 102, a name of a dweller, a name of the room, a call table when a construction worker or the manager sets it, and other information. The conversation unit 105 is composed of a microphone and a speaker for a conversation with a dweller or the manager.

The collective entrance device CPU 106 performs processing for controlling the operation of each of the components of the collective entrance device 10. For example, when a call manipulation is performed on the input unit 102, the collective entrance device CPU 106 determines a call target room parent device 30 on the basis of the input contents of the call manipulation and the call table. The collective entrance device CPU 106 transmits, as a call signal for calling the determined room parent device 30, a room parent device ID of the room parent device 30 to all the room parent devices 30 in the building where it is installed. The input contents of the call manipulation include the content of a key input (a room number, a name of a person, or another kind of name) that is input through a ten-key unit or alphabetical keys, the content of a push manipulation of pushing dedicated buttons (in the case where those buttons exist), and other information.

Furthermore, when a setting manipulation for setting a call table is performed on the input unit 102, the collective entrance device CPU 106 performs processing of automatically registering or deleting a room parent device ID for a set item. The collective entrance device CPU 106 can operate in a constructor setting mode in which a construction worker can set a call table and a manager setting mode in which the manager can set a call table.

The collective entrance device I/F 107 forms a bidirectional signal transmission path between the collective entrance device CPU 106 and the intercom line L1.

Although not shown in any drawings, like the collective entrance devices 10, the management room parent device 20 has a storage unit that is stored with a call table and is configured so as to perform call processing according to a call manipulation and perform setting processing according to a setting manipulation.

Figure 3A:
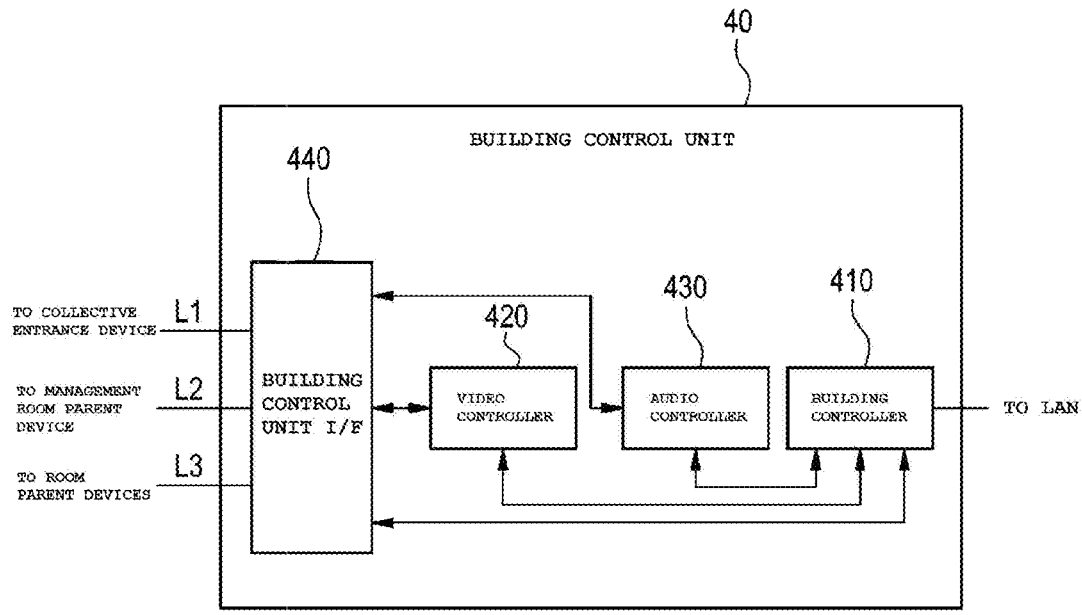
FIG. 3A is a functional block diagram of a building control unit.
Figure 3B:
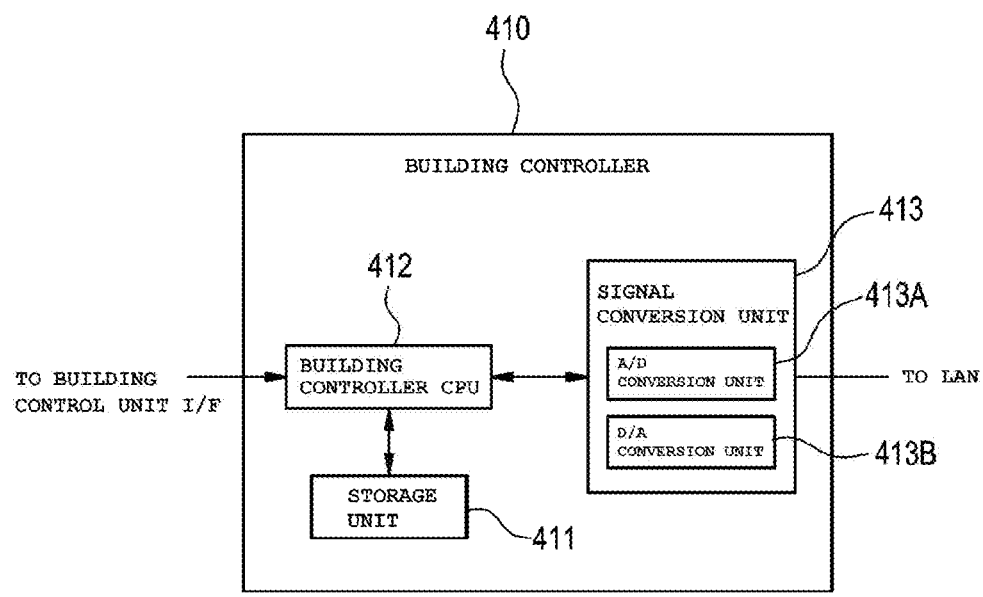
FIG. 3B is a functional block diagram of a building controller.

As shown in FIG. 3A, the building control unit 40 is equipped with a building controller 410, a video controller 420, an audio controller 430, and a building control unit I/F 440. As shown in FIG. 4(*b*), the building controller 410 is equipped with a building storage unit 411, a building controller CPU 412, and a signal conversion unit 413.

The building storage unit 411 of the building controller 410 is stored with, among other information, a call table in which room numbers of the rooms of the building where it is installed and names of dwellers of rooms and names (e.g., tenant names) of rooms are correlated with room parent device IDs for identification of the room parent devices 30 in the rooms, respectively.

The building controller CPU 412 performs processing for controlling the operation of each of the components of the building controller 410. For example, when receiving from the management center 5 a room number or a name of a person or another kind of name for calling a room parent device 30 in the building where it is installed, the building controller CPU 412 determines the room parent device 30 on the basis of the call table and transmits the room parent device ID to all the room parent devices 30 in the building where it is installed.

The signal conversion unit 413 is a circuit for performing mutual conversion between a signal used in the intercom lines L1-L3 and a signal used in the network N. The signal conversion unit 413 has an analog-to-digital (hereinafter referred to as A/D) conversion unit 413A and a digital-to-analog (hereinafter referred to as D/A) conversion unit 413B.

The A/D conversion unit 413A converts an analog signal that can be communicated through the intercom lines L1-L3 in each residential building into a digital signal that can be communicated over the network N between residential buildings and between each residential building and the management center. On the other hand, the D/A conversion unit 413B converts a digital signal that can be communicated over the network N between residential buildings and between each residential building and the management center into an analog signal that can be communicated through the intercom lines in each residential building.

The video controller 420 performs signal processing on a video signal taken by the camera 103 of a collective entrance device 10 or a video signal transmitted from the management center 5 and transmits a resulting video signal to each room parent device 30 or the management room parent device 20 in the building where it is installed. The audio controller 430 performs audio processing on an audio signal transmitted from the conversation unit 105 of a collective entrance device 10, the conversation unit 202 of the management room parent device 20, or the management center 5 and transmits a resulting audio signal to each room parent device 30 or the management room parent device 20 in the building where it is installed.

The building control unit I/F 440 forms a bidirectional signal transmission path between the building controller 410, the video controller 420, and the audio controller 430 and the intercom lines L1-L3.

Although not shown in any drawings, like the building control unit 40, the intensive control unit 70 in the management center is equipped with signal conversion units (A/D conversion unit and D/A conversion unit) and performs conversion between an analog signal that can be communicated through the intercom lines L4 and L5 and a digital signal that can be communicated through the network N.

Next, how the intercommunication system 1 operates will be described with reference to FIGS. 4-9.

Example Operation-1

The intercommunication system 1 operates in the following manner when construction workers generate and update, for example, the call table shown in FIG. 4 in installing the intercommunication system 1. The call table A shown in FIG. 4 is a call table that is stored in a collective entrance device 10 of residential building-A. Each room of residential building-A is used in shared house form; for example, four persons, two persons, and three persons are living in the rooms No. 101, No. 102, and No. 103, respectively. In this example, a maximum of four persons can live in one room.

First, the construction workers generate a call table. For example, an "initial setting button" that is included in the setting buttons 112 of the collective entrance device 10 is pushed. In response, a blank call table (not shown) for initial setting is displayed on the collective entrance display unit 104 of the collective entrance device 10. Then the construction workers carry out link setting work, whereby the name of a first dweller among plural dwellers who share each of rooms having room numbers 101, 102, and 103 (Abe for No. 101, Iizuka for No. 102, and Aoki for No. 103) is registered as shown in FIG. 5. The link setting work is carried out in such a manner that workers stand beside both of the collective entrance device 10 and each room parent device 30 and setting data (e.g., "101-S1" for the room parent device of the room No. 101) is exchanged between the collective entrance device 10 and each room parent device 30. The registration numbers shown in the left end column of the call table A are numbers indicating the names of dwellers whose registration has been completed.

Then the construction workers set the call table.

As shown in FIGS. 6(a) and 6(b), registration setting for adding, for example, the names of other dwellers who share each room is performed. For example, to add the name of a dweller of the room No. 101, the cursor is moved to one position on the row, in which "101-Abe-S1" is displayed, of the call table A shown in FIG. 5 and then a "registration setting button," for example, is pushed. As a result, a blank row is displayed additionally under the row "101-Abe-S1" in the call table.

Subsequently, as shown in FIG. 6A, the room number "101" and a dweller name "Tanaka" are input and, for example, a "completion button" is then pushed. As a result, as shown in FIG. 6B, the same room parent device ID "S1" as the one already assigned to the same room number is automatically copied to the room parent device ID cell of the added row (i.e., the row in which "101-Tanaka" has been input) and registered. Then the number "2" is displayed in the registration number cell, whereupon the registration setting for the dweller name "Tanaka" is completed. In this case, for example, the registration numbers of the following dweller names "Iizuka" and "Aoki" are updated to "3" and "4," respectively.

Registration setting of the other dweller names of each room number is performed in the same manner, whereby the call table as shown in FIG. 4 is completed. A call table may be generated using one of the collective entrance devices 10A-10C and transmitted to the other collective entrance devices and the building control unit 40 over the intercom line.

Example Operation-2

The intercommunication system 1 operates in the following manner when the manager updates a call table in the manager setting mode.

2-1

If the dweller "JONES" of the room No. 101, for example, moves out in the state that the dwellers shown in the call table A shown in FIG. 4 live in each room, the manager performs deletion setting for deleting the dweller name etc. in the manner shown in FIGS. 7(a) and 7(b).

First, in, for example, a collective entrance device 10, a setting function is started and the operation mode goes into the manager setting mode.

After the cursor is moved to the cell, in which the dweller name "JONES" is displayed, of the call table A and the name "JONES" is deleted as shown in FIG. 7A, a "deletion setting button," for example, is pushed. As a result, as shown in FIG. 7B, all the data in the row in which "JONES" has been displayed, that is, the registration number "3," the "room number "101," and the room parent device ID "S1" are also deleted. In this case, in this example, the row itself that has become a blank row as a result of the deletion of the data is deleted and the following dweller data are displayed so as to be moved up sequentially.

2-2

If, for example, all the dwellers of the room No. 101 (Abe, Tanaka, and Suzuki) move out after JONES moved out as mentioned above, the following operation is performed.

For example, when the dweller names "Abe" and "Tanaka" are deleted in order from the top of the call table A, all the data in each row are deleted and the following dweller data are moved up sequentially as in the above-described case of "JONES." However, when the last dweller name "Suzuki" is deleted, as shown in FIG. 8 the data are deleted automatically from the dweller name cell and the registration number cell and these cells become blank cells but the data ("101" and "S1") in the room number cell and the room parent device ID cell are not deleted and are kept displayed. In this case, the link setting for the room parent device 30 corresponding to the room No. "101" is kept stored as it is.

2-3

If a new dweller moves into, for example, the room No. 102 in the state that the dwellers shown in the call table A shown in FIG. 7B live in each room, the manager performs registration setting for adding the dweller name etc. in the manner shown in FIGS. 9(a) and 9(b).

After the cursor is moved to one position on the row, in which the room number "102" is displayed, of the call table A shown in FIG. 7B and then the "registration setting button," for example, is pushed. As a result, a blank row is displayed additionally under the row "102-Harry-S2" in the call table.

Subsequently, as shown in FIG. 9A, after the room number "102" and a dweller name "Kawai" are input, the "completion button," for example, is then pushed. As a result, as shown in FIG. 9B, the same room parent device ID "S2" as the one already assigned to the same room number is automatically copied to the room parent device ID cell of the added row (i.e., the row in which "102-Kawai" has been input) and registered. Then the number "6" is displayed in the registration number cell, whereupon the registration setting for the dweller name "Kawa" is completed. In this case, for example, the registration numbers of the following dweller names "Aoki," "Yamazaki," and "Shimoyanagi" are updated to "7," "8," and "9," sequentially. The updated call table may be transmitted to the other collective entrance devices and the building control unit 40 via the intercom line.

Incidentally, conventionally, in setting call table data in, for example, an apartment in which each room is used in a shared house form, in initial setting of a call table a construction worker needs to perform link setting a number of times that is equal to the number of dwellers living in each room. Furthermore, when a new dweller moves in after initial setting was made, a construction worker needs to perform link setting for the new dweller. As a result, link setting work takes long time and the work load of a construction worker is heavy.

In contrast, in the collective entrance devices 10 and the intercommunication system 1 according to the embodiment, when a construction worker or the manager adds a new dweller name for an existing room number, a room parent device ID that is already assigned to the same room number is registered as a room parent device ID of the new dweller name. Thus, in making initial setting of a call table, it suffices for a construction worker to carry out link setting work only in registering a first dweller name for one room number; it is not necessary to carry out link setting work in adding second and following dweller names for the same room number. Likewise, in updating a call table, it is not necessary to carry out link setting work in adding second and following dweller names for the same room number. In this manner, in registering plural dweller names for the same room number, the number of times of carrying-out of link setting work can be made smaller and hence the load of link setting work that is carried out by a construction worker can be reduced.

Conventionally, when a dweller name is deleted from a call table due to relocation of a dweller, only the dweller name is deleted from the call table and other unnecessary past data (room number, room parent device ID, etc.) that are stored in connection with the dweller name are left undeleted.

In contrast, in the collective entrance devices 10 and the intercommunication system 1 according to the embodiment, when a dweller name is deleted, a room number, a room parent device ID, etc. that are correlated with the dweller name are deleted automatically and no unnecessary past data remain in the call table. This allows a worker to check a current status of the call table easily.

Incidentally, when the name of the last one of dwellers who have already been registered for the same room number is deleted, if a room parent device ID that is correlated with the dweller name to be deleted were deleted, a situation occurs that no room parent device ID is registered for this room number in the call table. This requires work of setting a new link in registering a new dweller name for that room number later.

In view of the above, in the collective entrance devices 10 and the intercommunication system 1 according to the embodiment, in deleting the name of the last one of dwellers who have already been registered for the same room number, a room parent device ID and a room number that are correlated with the dweller name to be deleted are not deleted. As a result, even if the last dweller name is deleted, the state that link setting is made for a room parent device corresponding to this room number can be maintained. It is therefore not necessary to carry out work of setting a new link in registering a new dweller name for that room number later and hence the call table can be updated easily.

Conventionally, a construction worker who carries out link setting work is given the right to add a new dweller name to a call table and a manager is not. This is because if an error that occurs in link setting work it may cause an erroneous operation of the intercommunication system.

In contrast, in the collective entrance devices 10 and the intercommunication system 1 according to the embodiment, since no link setting is necessary in adding second and following dweller names, the manager is also given the right to add and delete a dweller name for the same room number to and from the call table. As a result, even in a case that plural dwellers come to live in or leave, in a short period, a room that is used in, for example, a shared house form, the manager can easily update the call table without carrying out link setting work. Also for a room that is not used in a shared house form (e.g., it is used by a single dweller), since it is not necessary to perform link setting newly, the manager is allowed to update the call table.

The invention is not limited the above embodiment, and various modifications, improvements, etc. can be made as appropriate. And the material, shape, dimensions, related numerical values, form of implementation, number (where plural ones are provided), location, etc. of each constituent element of the embodiment are optional and no limitations are imposed on them as long as the invention can be implemented.

DESCRIPTION OF SYMBOLS

1: Intercommunication system; 10A-10C: Collective entrance devices (example terminal devices); 20: Management room parent device (example terminal device); 30: Room parent device; 40: Building control unit; 101: Storage unit; 102: Input unit; 106: Collective entrance device CPU (example control unit); 112: Setting buttons; 410: Building controller; 411: Building storage unit; 412: Building controller CPU.

The invention claimed is:

1. A terminal device which communicates with room parent devices installed in respective rooms, comprising:
   an input unit which enables input of at least a dweller name as a call manipulation for calling a particular room parent device;
   a storage unit which is stored with a call table in which a room number, a dweller name and room parent device identification information assigned to each of the room parent devices are correlated with each other; and
   a control unit which determines a call target room parent device on the basis of an input content of the call manipulation and the call table and performs a call control for calling the determined room parent device, wherein:
   in adding a new dweller name for an existing room number to the call table stored in the storage unit, the control unit automatically associates the room parent device identification information with the new dweller name by registering the new, dweller name with the room parent device identification information without having to register other dweller names associated with the same room parent device identification information.

2. The terminal device according to claim 1, wherein in deleting an already registered dweller name for an existing, room number from the call table stored in the storage unit, the control unit automatically deletes room parent device identification information that is correlated with the dweller name to be deleted.

3. The terminal device according to claim 1, wherein in deleting a last already registered dweller name for an existing room number from the call table stored in the storage unit, the control unit does not automatically delete room parent device identification information that is correlated with the dweller name to be deleted.

4. The terminal device according to claim 1, wherein:
   the control unit can operate in a constructor setting mode in which a construction worker who installs a terminal device can set a call table and in a manager setting mode in which a manager can set a call table; and
   in adding a new dweller name for an existing room number to the call table stored in the storage unit in the manager setting mode, the control unit automatically registers, as room parent device identification information of the new dweller name, the room parent device identification information that is already assigned to the same room number.

5. An intercommunication system comprising the terminal device according to claim 1.

6. The terminal device of claim 1, wherein the room parent devices comprise a display unit, a manipulation unit, and a conversation unit.

* * * * *